United States Patent [19]

Ledjeff et al.

[11] Patent Number: 5,723,086
[45] Date of Patent: Mar. 3, 1998

[54] ELECTRODE MEMBRANE

[75] Inventors: Konstantin Ledjeff, Bad Krozingen; Roland Nolte, Denzlingen; Michael Bauer, Freiburg; Falko Mahlendorf, Freiburg; Volker Peinecke, Freiburg, all of Germany

[73] Assignee: Fraunhofer-Gesellschaft Zur Forderung Der Angewandten Forschung E.V., Munich, Germany

[21] Appl. No.: 448,567

[22] PCT Filed: Dec. 2, 1993

[86] PCT No.: PCT/DE93/01162

§ 371 Date: Jul. 12, 1995

§ 102(e) Date: Jul. 12, 1995

[87] PCT Pub. No.: WO94/14203

PCT Pub. Date: Jun. 23, 1994

[30] Foreign Application Priority Data

Dec. 7, 1992 [DE] Germany .......................... 42 41 150.5

[51] Int. Cl.$^6$ .......................... C25B 13/00; C25B 11/00; H01M 8/10; B31B 1/60
[52] U.S. Cl. .......................... 264/248; 204/282; 204/283; 204/296; 429/30; 429/33; 429/41; 521/27; 156/60
[58] Field of Search .......................... 204/282, 283, 204/296; 429/30, 33, 141; 521/27; 156/60; 264/248

[56] References Cited

U.S. PATENT DOCUMENTS

| 3,134,696 | 5/1964 | Douglas et al. | 136/86 |
|---|---|---|---|
| 3,134,697 | 5/1964 | Niedrach | 136/86 |
| 3,226,361 | 12/1965 | Borman | 204/296 |
| 4,210,501 | 7/1980 | Dempsey et al. | 204/129 |
| 4,272,353 | 6/1981 | Lawrance et al. | 204/283 |
| 4,302,303 | 11/1981 | Guillaume et al. | 204/296 |
| 4,421,579 | 12/1983 | Covitch et al. | 156/60 |
| 4,461,682 | 7/1984 | Oda et al. | 204/283 |
| 4,469,579 | 9/1984 | Covitch et al. | 204/283 |
| 4,555,453 | 11/1985 | Appleby | 429/41 |
| 4,568,441 | 2/1986 | Covitch et al. | 204/283 |
| 4,828,941 | 5/1989 | Sterzel | 429/33 |
| 5,443,927 | 8/1995 | Nakajima et al. | 429/215 |

FOREIGN PATENT DOCUMENTS

| 2844499 | 6/1979 | Germany . |
|---|---|---|
| 3041844 | 5/1981 | Germany . |
| 3036066 | 5/1982 | Germany . |
| 8038934 | 9/1978 | Japan . |
| 57-054288 | 3/1982 | Japan . |

OTHER PUBLICATIONS

Patents Abstracts of Japan, vol. 10, No. 235, C-366; No date available.
A.J. Appleby and E.S. Yeager, *Energy*, vol. 11, p. 137, 1986, Oxford; No month.
M.S. Wilson and S. Gottesfeld, *Journal of Applied Electrochemistry*, vol. 22, pp. 1–7, 1992; No month.

*Primary Examiner*—Kathryn L. Gorgos
*Assistant Examiner*—Edna Wong
*Attorney, Agent, or Firm*—Greenblum & Bernstein, P.L.C.

[57] ABSTRACT

The present invention relates to electrode membranes which comprise an ion-exchange material forming a core zone, with electrodes bonded thereto on both sides, the ion exchange material being formed from homopolymers soluble in solvents, or copolymers or mixtures thereof. The polymers must have at least one residue dissociable in ions. The electrode material is connected on either side of the core zone to the ion-exchange material to form an intimate contact between the electrode and the ion exchange materials, while the external sides of the electrode are pure electrode material. The electrode membranes are useful for forming fuel cells or electrolyzers.

32 Claims, 3 Drawing Sheets

ELECTRODE MEMBRANE

This is a national stage application of PCT/DE93/01162 filed Dec. 2, 1993.

FIELD OF THE INVENTION

The invention relates to an electrode membrane comprising an ion exchange material forming a core zone and electrodes bonded on either side thereof, for fuel cells or electrolyser, and to a method of manufacturing these electrode membranes.

BACKGROUND OF THE INVENTION

Electrolysers and fuel cells are electrochemical systems which can convert electrical energy into chemical energy (principle of electrolysis) or chemical energy into electrical energy (fuel cell principle). Thus a water electrolyzer with the aid of electrical energy produces hydrogen and oxygen, and conversely a hydrogen/oxygen fuel cell converts these gases into water, releasing electrical energy. In order to operate, these systems among other things require two catalytically active electrodes for electrochemical conversion of the chemical substances, and an ion-conducting electrolyte between the electrodes for charge transfer.

Examples of modern electrolyzer and fuel cell constructions are systems which do not use any liquid electrolyte, but rather highly-conductive polymeric ion exchange membranes (polymeric solid electrolytes).

The central purpose of these systems is the production of the membrane electrode unit with the smallest possible resistance, in order to minimize the excess voltages occurring. This initially means the realization of minimum electrical losses during the transition between electrode and ion-conductive membrane. In this case an intensive bonding is necessary of the polymeric membrane to the catalyst, in order to ensure problem-free supply or derivation of the protons migrating through the membrane towards or from the catalyst, and the transfer of electrons between electrode and reactant. When there is poor bonding, no direct contact exists, at least at many points, between the materials, which leads to an excess voltage. In addition, porous membrane and catalyst surfaces are desirable, in order to make a large area available, because of their roughness, for the three-phase contact of membrane/catalyst/liquid or gas. A low resistance of the electrode-membrane-electrode unit in addition means realization of a low resistance of the ion exchange membrane itself, in which case minimal thickness and high ion exchange capacity play an important part.

In the prior art, insoluble and infusible ion exchange membranes are proposed for the polymeric solid electrolyte. These prefabricated membranes are subsequently brought into contact with the electrodes by means of wet chemical or hot pressing methods.

In the wet chemical method the membrane is for example incorporated in a coating cell, so that the cell is divided by the membrane into two spaces separate from one another. One side contains hexachloroplatinic acid, the other for example hydrazine as a reduction agent, which diffuses through the membrane and precipitates platinum in the surface area of the membrane. Such a method is described by H. Takenaka and E. Torikai (JP 80-38934, Application 78/110, 267 of 7 Sep. 1978).

Alternatively, the catalyst may be bonded by means of application of pressure. In this case the outset material is the catalytically active powder, which is pressed on to the membrane. A general description of the pressing method appears in Appleby, Yeager, Energy (Oxford), 11 (1986), 137.

Although operative membrane electrode units can be produced by this method, they have disadvantages. Both methods use the polymeric ion conductor in a solid, i.e. dimensionally stable phase. A certain degree of bonding is in fact provided between catalyst and polymer, but it is scarcely possible to achieve the desired intensive, adhesive-like bonding of both materials. It is only possible with difficulty to provide an additional surface porosity of the dense membrane used. In addition, both methods are critical precisely for coating extremely thin membranes, i.e. membranes with low resistance. In the case of a wet chemical process, there is the risk that the metal precipitation will expand from the edge zone of the membrane into the central zone, and can thus lead to electrical short circuits in the membrane. In the case of hot pressing, considerable pressures and temperatures are necessary in order to obtain acceptable electrochemical characteristics, so that here, precisely in the case of thin membranes, there is a danger of damage to membranes, e.g. the penetration of catalyst granules through the membrane.

SUMMARY OF THE INVENTION

It is therefore the purpose of the invention to provide electrode membranes for fuel cells or electrolyzers, which ensure an integral connection of the electrode with the ion-conductive material. In this way low electrical losses in the transition between electrode and ion-conductive membrane are intended to be achieved. It should at the same time be possible to produce extremely thin ion-conductive layers, which may be provided with an additional degree of porosity in the surface area.

It is proposed according to the invention that the ion-conductive material of the core zone is formed by polymers which are soluble in solvent, at least a portion of the polymer having a residue which is dissociable in ions, because of the required ion-conductivity. A decisive factor in this respect is the solubility of the core membrane. The structure of the electrode membrane according to the invention is possible by its selection of polymers soluble in solvents. In this case the electrodes are integrated on both sides of the core zone into the surfaces of the core zone of the ion-conductive material. A further factor essential to the invention is that the external surface of the electrodes is free of ion-conductive material, and thus has a purely electronic conductivity, whereas the intermediate region, i.e. between the pure core zone and the purely electronically conductive external zone, is ionically and electronically conductive. In this case the electrode material has an intense, adhesive-like bond between catalyst and membrane. This means first of all the production of low electrical losses in the transition between electrode and ion-conductive membrane. At the same time the electrode membranes proposed according to the invention enable the production of extremely thin membranes (in the range from 10 to 500 μm), which secondly means the realization of a low resistance for the ion-exchange membrane itself.

According to a preferred embodiment of the invention, the electrode membrane is porous in the region of the ionically and electronically conductive intermediate zone and of the purely electronically conductive zone. Porous membrane and catalyst surfaces are advantageous, since because of their roughness, a large area is available for the three-phase contact membrane/catalyst/liquid or gas.

There may be used as a base material for production of the electrode membranes homopolymers, copolymers or mixtures thereof, which may be obtained as viscous solutions with suitable solvents. For this purpose there may also be included suitable liquid monomers as solvents (e.g. styrol). The following monomeric units may be contained for example in the homo/copolymers or mixtures thereof; at least one unit must contain a residue dissociable in ions, in order to ensure sufficient ionic conductivity. By monomeric units are understood according to the invention the units which are necessary to build up the polymer. In particular structures are used which have sufficient chemical stability in fuel cell/electrolyzer operations, such as for example substituted Poly(diene):

[—$CH_2$—$C(R_1)$=CH—$CH_2$—]
[—$CH_2$—$C(R_1(CH=CH_2))$—]
[—$CH_2$—$CH(C(R_1)=CH_2)$—]

$R_1$=—H, —$CH_3$ substituted Poly(alkene):

[—$CH_2$—$C(R_2)(R_3)$—]

$R_2$=—H, —$CH_3$—

$R_3$=—COOH, —COO($R_4$), —$CONH_2$, —CN, —OH, —O($R_4$), —OC(O)($R_4$), —C(O)($R_4$), —Cl, —$C_6H_4$($R_5$)

$R_4$=—$CH_3$, —$C_2H_5$, —$C_3H_7$, —$C_4H_9$ $R_5$=—COOH, —$SO_3H$, —$PO_3H_2$ substituted Poly(phenyleneoxide) und Poly(phenylenesulfide):

[—$X_1$—$R_6$—]

$X_1$=—O—, —S—

$R_6$=—$C_6H_4$—, —$C_6H_3(R_5)$—, —$C_6H_2(CH_3)_2$—, —$C_6H(CH_3)_2(R_5)$—

$R_5$=—COOH, —$SO_3H$, —$PO_3H_2$ substituted Poly(ester):

[—O—C(O)—$R_{14}$—], [—O—C(O)—$R_{14}$—C(O)—O—$R_{17}$]

$R_{14}, R_{17}$=—$C_6H_4$—, —$C_6H_3(R_5)$—, —$C_6H_2(CH_3)_2$—, —$C_6H(CH_3)_2(R_5)$—, —$CH_2$—, —$C_2H_4$—, —$C_3H_6$—, —$C_4H_8$— $R_5$=—COOH, —$SO_3H$, —$PO_3H_2$ substituted Poly(carbonate):

[—O—C(O)—O—$R_{14}$—C(CH_3)_2—$R_{17}$—]

$R_{14}, R_{17}$=—$C_6H_4$—, —$C_6H_3(R_5)$—, —$C_6H_2(CH_3)_2$—, —$C_6H(CH_3)_2(R_5)$—, —$CH_2$—, —$C_2H_4$—, —$C_3H_6$—, —$C_4H_8$—

$R_5$=—COOH, —$SO_3H$, —$PO_3H_2$ substituted Poly(urethane):

[—NH—C(O)—O—$R_{14}$—]

—$C_6H_4$—, —$C_6H_3(R_5)$—, —$C_6H_2(CH_3)_2$—, —$C_6H(CH_3)_2(R_5)$—, —$CH_2$—, —$C_2H_4$—, —$C_3H_6$—, —$C_4H_8$—

$R_5$=—COOH, —$SO_3H$, —$PO_3H_2$ substituted Poly(amide):

[—NH—C(O)—$R_{14}$—], [—NH—C(O)—$R_{14}$—C(O)—NH—$R_{17}$—]

$R_{14}, R_{17}$=—$C_6H_4$—, —$C_6H_3(R_5)$—, —$C_6H_2(CH_3)_2$—, —$C_6H(CH_3)_2(R_5)$—, —$CH_2$—, —$C_2H_4$—, —$C_3H_6$—, —$C_4H_8$—

$R_5$=—COOH, —$SO_3H$, —$PO_3H_2$ substituted Poly(carbamide):

[—NH—C(O)—NH—$R_{14}$—]

$R_{14}$=—$C_6H_4$—, —$C_6H_3(R_5)$—, —$C_6H_2(CH_3)_2$—, —$C_6H(CH_3)_2(R_5)$—, —$CH_2$—, —$C_2H_4$—, —$C_3H_6$—, —$C_4H_8$—

$R_5$=—COOH, —$SO_3H$, —$PO_3H_2$ substituted Poly(sulfone):

[—$S(O)_2$—$R_7$—O—$R_8$—$C(CH)_2$—$R_9$—O—$R_{10}$—]

$R_7, R_8, R_9, R_{10}$=—$C_6H_4$—, —$C_6H_3(R_5)$—, —$C_{10}H_6$—, —$C_{10}H_5(R_5)$—

$R_5$=—COOH, —$SO_3H$, —$PO_3H_2$ substituted Poly(ethersulfone):

[[—$S(O)_2$—$R_7$—]$_n$ [—O—$R_8$—]$_m$]

n, m=1 or 2

$R_7, R_8$=—$C_6H_4$—, —$C_6H_3(R_5)$—, —$C_{10}H_6$—, —$C_{10}H_5(R_5)$—

$R_5$=—COOH, —$SO_3H$, —$PO_3H_2$ substituted Poly(sulfonate):

[—O—S(O)—O—$R_6$—]

$R_6$=—$C_6H_4$—, —$C_6H_3(R_5)$—, —$C_{10}H_6$—, —$C_{10}H_5(R_5)$—

$R_5$=—COOH, —$SO_3H$, —$PO_3H_2$ substituted Poly(etherketone)

[[—C(O)—$R_7$—]$_n$[—O—$R_8$—]$_m$]

n, m=1 or 2

$R_7, R_8$=—$C_6H_4$—, —$C_6H_3(R_5)$—, —$C_{10}H_6$—, —$C_{10}H_5(R_5)$— substituted Poly(perfluoroaliphatic)

[—$CF_2$—$CF(R_{11})$—]

$R_{11}$=—F, —$C_6H_5$, —$C_6H_4(R_5)$, —$OC_6H_4(R_5)$ $R_5$=—COOH, —$SO_3H$, —$PO_3H_2$ substituted Poly(benzoxazole):

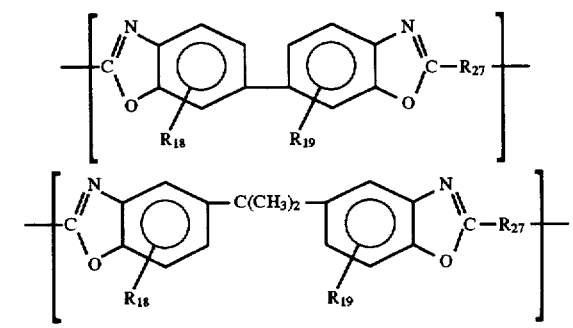

$R_{27}$=—$C_6H_3(R_{20})$—, —$(CH_2)_p$—

$R_{18}, R_{19}, R_{20}$=—H, —COOH, —$SO_3H$, —$PO_3H_2$ p=2-8 substituted Poly(benzimidazole):

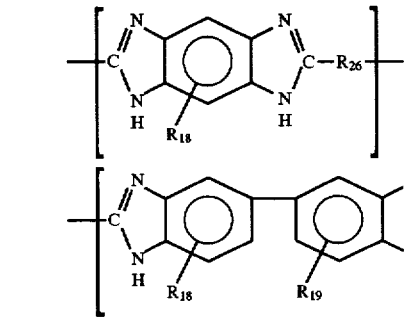

$R_{26}$=—$C_6H_3(R_{20})$—, —$(CH_2)_p$—

$R_{18}, R_{19}, R_{20}$=—H, —COOH, —$SO_3H$, —$PO_3H_2$ p=2-8 substituted Poly(dithiazole):

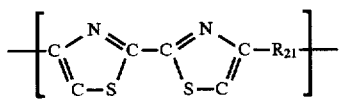

$R_{21}$=—$C_6H_3(R_{20})$—, —$C_6H_3(R_{20})$—$(CH_2)_p$—$C_6H_3$
$(R_{20})$—

$R_{20}$=—H, —COOH, —$SO_3H$, —$PO_3H_2$
p=2-8 substituted Poly(benzothiazole):

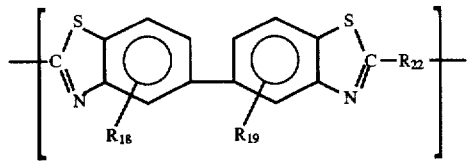

$R_{22}$=—$C_6H_3(R_{20})$—, —$C_6H_3(R_{20})$—O—$C_6H_3(R_{20})$—,
—$C_6H_3(R_{20})$—C(O)—$C_6H_3(R_{20})$—

$R_{18}$, $R_{19}$, $R_{20}$=—H, —COOH, —$SO_3H$, —$PO_3H_2$
substituted Poly(phenylchinoxaline)

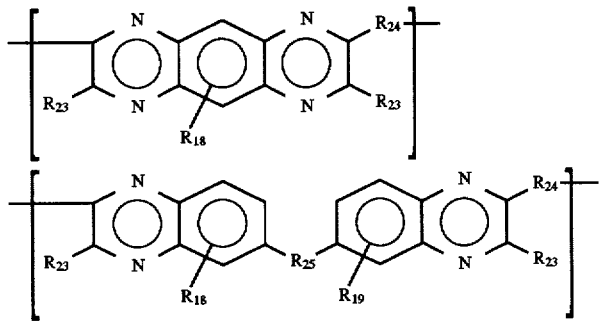

$R_{23}$=—H, —$C_6H_4(R_{20})$
$R_{24}$=—$C_6H_3(R_{20})$—, —$C_6H_3(R_{20})$—$R_{25}$—$C_6H_3$
$(R_{20})$—, $R_{25}$—O—, —S—, —$S(O)_2$, —C(O)—

$R_{18}$, $R_{19}$, $R_{20}$=—H, —COOH, —$SO_3H$, —$PO_3H_2$
substituted Poly(phosphazene)
[—P($R_{12}$)($R_{13}$)=N—]

$R_{12}$, $R_{13}$=—$OCH_3$, —$OC_2H_5$, —$OC_3H_7$, —$OC_4H_9$,
—$OC_6H_5$, —$OC_6H_4(R_5)$ $R_5$=—COOH, —$SO_3H$, —$PO_3H_2$
substituted Poly(siloxane)
[—O—Si($OR_{15}$)($OR_{16}$)—]
[—O—Si($R_{15}$)($R_{16}$)—]

$R_{15}$, $R_{16}$=—$CH_3$, —$C_2H_5$, —$C_3H_7$, —$C_4H_9$, —$C_6H_5$,
$C_6H_4(R_5)$ $R_5$=—COOH, —$SO_3H$, —$PO_3H_2$

The monomeric units are used at a degree of polymerization which still enables a solution or viscous solution of the polymers. Furthermore, structural elements may be contained which enable subsequent interlacing of the polymeric material in the electrode membrane. In this way the swelling properties of highly conductive ion exchange membranes may be favorably influenced. Ion exchange membranes generally possess a high degree of swelling, which considerably impairs the mechanical properties of the membrane. Interlacing of the membrane reduces the maximum degree of swelling and thus improves the profile of properties of the membrane. This interlacing may be effected thermally, chemically or photochemically.

For example, a portion of the sulfonic acid group in the activated form (sulfoazolide) in the residue $R_5$ may be converted with an added diamine into an interlacing sulfonamide. Activation of the sulfonic acid groups into sulfoazolide is effected by conversion with N,N'-carbonyldiimidazole.

Accessible electrode materials are used for the electrode. There are preferably used, as electrode material, substances or carrier-bound substances which represent electrochemical catalysts for the redoxreactions $H_2/H^+$ and $O_2/O^{2-}$. In this case there are particularly used metals, alloys, oxides, mixed oxides or mixtures thereof. Underlying these substances are mostly elements of the VIII side group of the periodic table; in addition substances may be obtained with underlying elements from other groups of the periodic table. Materials without carriers, or materials applied on a carrier such as carbon, titanium, tantalum or similar may be employed.

The electrode membranes according to the invention have a conductivity transfer which migrates from the core zone A towards the external side to a purely electronic conductivity. The transition may be in a step wise form, i.e. in layers, or also continuous.

The invention further relates to a method for manufacturing the electrode membranes.

The invention shows two basic ways of producing such an electrode membrane.

On the one hand it is possible firstly to produce the core zone A and to produce the electrode material in a separate process step, and then to etch either the electrode surface or the membrane side or both components by a solvent or by a polymer solution and then to combine the two components, i.e. the core zone and the two electrodes, by pressing them together.

The second variant proposed according to the invention (claim 10) now proposes that the core zone be formed by respectively coating the electrode material on one side with the ion-conductive material and then, after wetting or etching the ion-conductive surface, forming the electrode material by pressing these two components together. The core zone thus in this case arises from the combination of the two coated semifinished membrane electrode units.

Production of the electrode material for the first variant, i.e. for the combination of three components, is known in principle from prior art. According to M. S. Wilson and S. Gottesfeld, Journal of Applied Electrochemistry 22 (1992), Pages 1 to 7, it is known to apply a thin layer of catalyst particles (1-20 um) to a carrier structure and then to detach it at that point. The "single" electrode produced in this way can have added thereto according to the invention during production as an additive or filler, a motive agent and/or water-repelling agent. Motive agents are used in order to prevent substances to be applied during subsequent preparation steps from filling the entire pore system and deactivating it. Water-repelling agents are necessary in order to obtain water-rejecting non-floodable electrodes for fuel cell operation.

Along with these so-called "single" electrodes, "activated" electrodes may also be used according to the invention for producing the electrode membrane. Activated electrodes according to the invention are understood to be a single electrode produced as described above, which is additionally treated with a solution or emulsion of a defined concentration of an ion-conducting polymer. In this case the ion-conducting polymer, still in solution, can contain motive agents forming pores. The ion-conductive polymer may be applied by spraying under specific spray conditions, by painting on (paint brush, brush, etc.) or by impregnation.

In this way a large area of the electrode, i.e. the granule layers of the catalyst, are contacted and thus activated with the ion-conductive material. In this activation procedure, care must be taken on the one hand that a sufficiently large proportion of the electrodes is contacted, and on the other hand that the entire layer is not flooded with the ion-conductive material, thus rendering access by gas difficult or impossible. Finally the solvent is evaporated, and a heat treatment, irradiation with light or an acidic treatment in order to release the gas of the added motive agents, may be effected simultaneously or subsequently. If monomers are used as a solvent, alternatively to the evaporation of the solvent, the monomer can be polymerized, polymerization being initiated by light, heat or by the decay of an initiator. As a result there is obtained an electrode which is partially wetted on the interior with polymer, and is superficially covered on one side with an extremely thin layer (0.1 to 5 um) of the polymer.

In order to produce the coated electrode for the second variant, a "single" or "activated" electrode like those described above is likewise produced. Then further polymer is applied to the surface of the activated electrode already thinly coated with polymer, by means of spraying, painting or pouring. After drying of this additional layer or polymerization of the monomers, by means of this procedure a portion (maximum 50%) of the membrane necessary in an electrochemical cell as electrolyte has thus been directly applied to the electrode (this electrode is termed, according to the invention, a semifinished membrane/electrode unit).

The desired structure of the electrode membrane in the transitional zone between pure ion-conduction and pure electronic conduction (good three-phase contact gas/polymer/electrode) can be achieved by appropriate setting of the spraying parameters and/or by the use of motive agents. The point of the use of motive agents is the controlled release of gas which enables the build up of a non-sealed porous duct-like structure in the interior of the electrode. The motive agents may be contained either during the production of the "activated" electrode in the polymer solution, or may be integrated into the production of the "single" electrode.

If the motive agent is contained as a dissolved component in the polymer solution, physical motive agents (gas formation because of evaporation) or chemical motive agents (gas formation because of a thermally- or photochemically-initiated chemical reaction) are possible. There may be considered as physical motive agents solvents miscible with the polymer solution, or as thermally-initiated chemical motive agents e.g. diphenylsulfon-3,3-disulfohyrazide (decay temperature 155° C.) or oxy-bis (benzolsulfonylsemicarbazide) (decay temperature 150° C.), and as photochemically-initiated motive agents azoinitiators such as azo-bis-(isobutyronitrile) (decay upon application of a wavelength of 350 nm). Gas release is effected during the production of the activated electrode after application of the polymer solution.

Solid motive agents may be considered for the "single" electrode. The solid motive agents may be applied either as a mixture with the catalyst to the carrier structure or subsequently to the already applied catalyst. The solid motive agent may not be soluble in the polymer solution. There are considered nitrogen-releasing solid materials such as azoinitiators, which are thermally initiated, or compounds developing carbon dioxide such as carbonates ($Na_2Co_3$, $K_2CO_3$), which are initiated by acid treatment. Initiation is effected either during production of the "activated" electrodes after application of the polymer solution or, if a "single" electrode is used, during production of the electrode membrane in the step where the core membrane is connected to the "single" electrodes.

As a third possibility, the "single" electrode may be impregnated with a physical liquid separating agent which is not miscible or miscible with difficulty with the polymer solution, such as for example as benzene or heptane. As the surface of the electrode dries rapidly, penetration of the polymer solution is ensured during the subsequent further processing. The motive agent is initiated thermally.

Production of the electrode membrane may be effected in various ways from the "single" electrodes, the "activated" electrodes or the "semifinished membrane/electrode units" already described above.

According to the first variant three components are processed. As materials there are used two "single" electrodes and a core membrane. The core membrane is a membrane with the polymers described according to the invention, which are soluble in suitable solvents. In order to produce the electrode membrane, the sides of the core membrane, or the electrodes, or both are wetted with a solvent or with a polymer solution etching the core membrane, e.g. by spraying, painting or wiping. The components so pre-treated are further used either immediately or after a short drying time. Integration of the catalytically active structures is effected by pressing the core membrane together with the "single" electrodes at a pressure of 0–10 bar and at a temperature between 20° and 150° C., so that the electrode structure is directly impressed into the uppermost etched layer of the core membrane. The solvent is then allowed to evaporate, or the monomer is polymerized, so that a solid integral structure results and the carrier material separates from the original "single" electrode in appropriate solutions.

In a development of the invention, so-called "activated" electrodes are used instead of the "single" electrode.

In this case likewise three components are processed. There now serve as outset materials two "activated" electrodes and a core membrane. Production of the electrode membrane is effected in a way analogous to the process steps which have been described in the above method.

According to the second variant, only two components are processed. There serve as outset materials in this case two semifinished membrane/electrode units, so that in this case the use of a core membrane can be eliminated. Production of the electrode membrane is effected by etching one or both of the semifinished membrane/electrode units with a solvent or with a polymer solution and the subsequent combination of the two pieces.

The invention relates finally to the use of an electrode membrane according to the invention for electrolyzers or fuel cells. Because of the design according to the invention of the electrode membrane, and its low internal transitional resistance, these electrode membranes are excellently suited for this purpose.

DETAILED DESCRIPTION OF THE PREFERRED EMBODIMENT

The invention will now be described in more detail with reference to an embodiment by way of example and a detailed description of the three figures.

EXAMPLE 1

30 grams of sulfonated polyethersulphone with a sulfonation degree of 90% are dissolved in 100 ml of dimethylformamide. A corresponding amount of this solution is homogeneously distributed on a glass plate and the solvent is allowed to evaporate overnight, so that a core membrane remains with a thickness of approximately 40 um. This is detached in 1 ml. of hydrochloric acid from the glass plate and then dried. Two platinum coated "single" electrodes are sprayed from a distance of 25 cm with the above named polymer solution for 40 seconds, so that the surface of the electrode is homogeneously covered with a viscous polymer film. The electrodes are dried for 4 hours in a water jet vacuum at 120° C. There then follows a short spraying (a few seconds) with dimethylformamide, followed by the now possible adhesion with the core membrane and subsequent drying of the electrode membrane (120° C., 4 hours, water jet vacuum). The electrode membrane freed from the carrier material of the "single" electrode can then be incorporated in a water electrolysis test cell.

Figure 1:
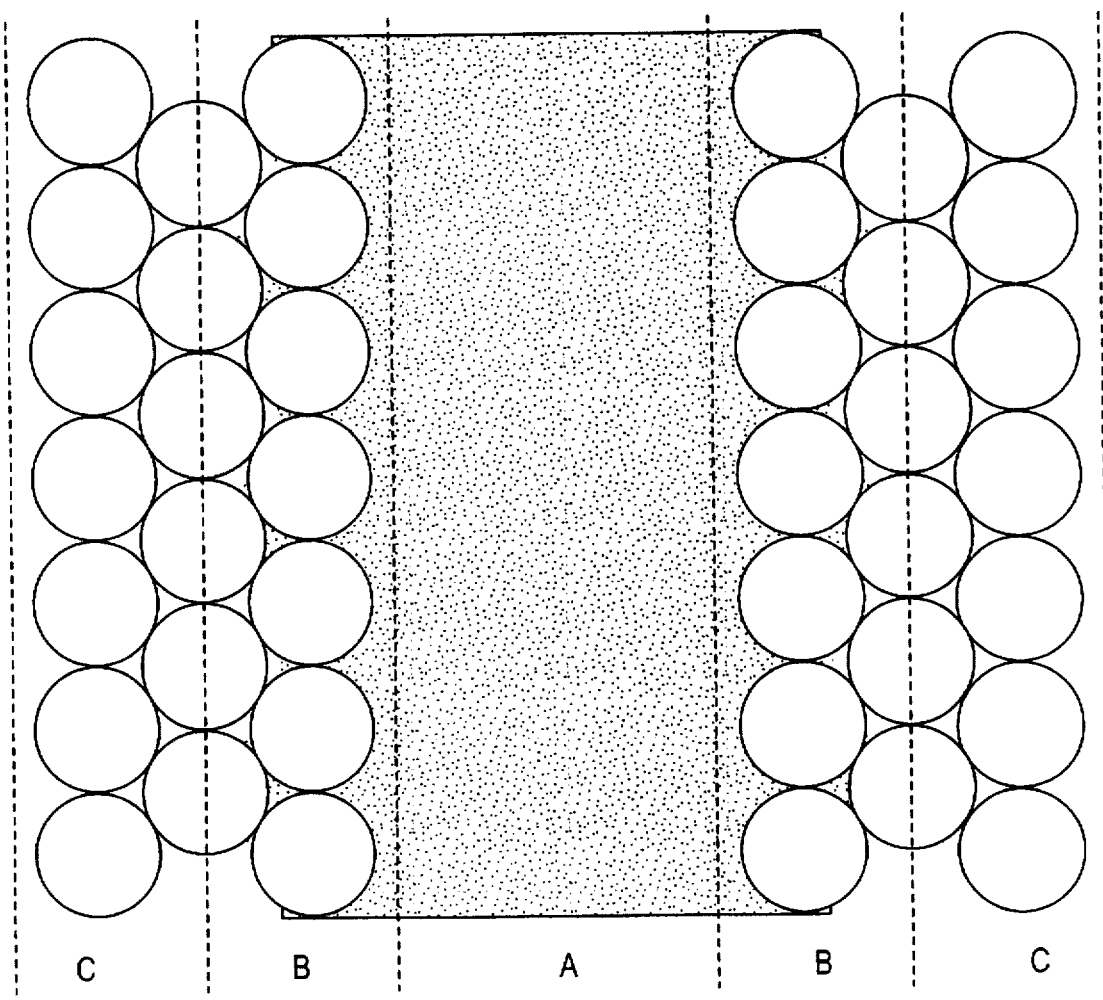
FIG. 1 shows the schematic structure of the electrode membrane in layer form.

The schematic structure of the overall membrane is shown in FIG. 1. The circles illustrated in FIG. 1 symbolize catalyst particles, e.g. platinum. The gridded surface in this case represents the ion-conductive material. Accordingly, an electrode membrane according to the invention may be built up in layers in such a way that a layer B follows on either side upon a central layer of type A (core zone of ion-conducting material). Following this layer B there is respectively a layer of type C, so that the electrode membrane can be subdivided into five zones in all. According to the invention, however, a continuous alteration of the layer properties is possible in the transition from one layer to the next layer. The profile of properties of layers A, B and C is given in Table 1.

TABLE 1

|  | Layer A | Layer B | Layer C |
| --- | --- | --- | --- |
| Thickness of zone | 1–500 um | 1–500 um | 1–500 um |
| Catalytic properties | no | yes | unnecessary |
| conductivity | ionic | ionic/electronic | electronic |
| Membrane structure | dense | porous | porous |
| Gas permeability | low | high | high |

Layer A corresponds to a sealed ion-exchange membrane. It has a purely ionic and not an electrical conductivity, and serves to transfer ions between the electrodes. It should have a low gas permeability, in order to prevent direct contact of various gases present on both sides, e.g. $H_2$ and $O_2$. Layer C corresponds to a porous electrical conductor. Due to the porous structure, the transport of materials from the exterior to the point of reaction or vice versa must take place; at the same time the electrically conductive surface serves as a contact for voltage supply or voltage derivation. The electrochemical reaction takes place in layer B. Therein there takes place the bonding of the ion-conductor to the catalyst, for which reason it must on the one hand be ion-conductive for transfer of ions to layer A, and on the other hand must also be electrically conductive for the transfer of electrons to layer C. A certain degree of porosity ensures the necessary roughness and the possibility of rapid transport of material of the species converted or to be converted.

An intensive adhesive-like bonding of the ion-conductor to the catalyst occurs during the production of the electrode membrane by means of the use of dissolved ion-conductive polymers instead of the solid materials previously used. In this solution the macromolecules are movable, as regards the mobility of two polymer chains relative to one another and also the segment mobility within a polymer chain. Wetting of the catalyst surface with polymeric solution and subsequent consolidation of the solution (evaporation of the solvent or polymerisation of liquid monomers) by reason of the high degree of mobility of chains and segments, permits a high proportion of monomeric units in the chain to interact with the catalyst, which means an adhesive-like good bonding of the materials. Undissolved and unmelted polymers, such as are used in commercial coating processes, do not have any such mobile chains, and thus have restricted mobility of segments, so that the interaction of polymer and catalyst is restricted for lack of the accessibility of the chains for optimum interaction with the substrate. Technical process steps during the production of the electrode membrane which require critical parameters for the membrane (high temperatures, high pressure, metal precipitation which is difficult to control) are not necessary. The production of extremely thin membrane electrode units is simple from this viewpoint.

The use of dissolved polymers to produce the ion-conductive structures permits integration of the abovementioned additional porosities in the membrane. By adding gas-developing motive agents, porous structures may be obtained during consolidation of the polymeric solution (evaporation of the solvent or polymerization of the monomers) by means of the initiating gas development. There are no such opportunities when using insoluble and infusible polymers.

By means of the concept of the electrode membrane there is achieved on the one hand an extremely intimate contact between active electrode and surface of the membrane electrolyte; on the other hand, extremely thin and thus ionically highly conductive membrane/electrode units can be produced.

Figure 2:
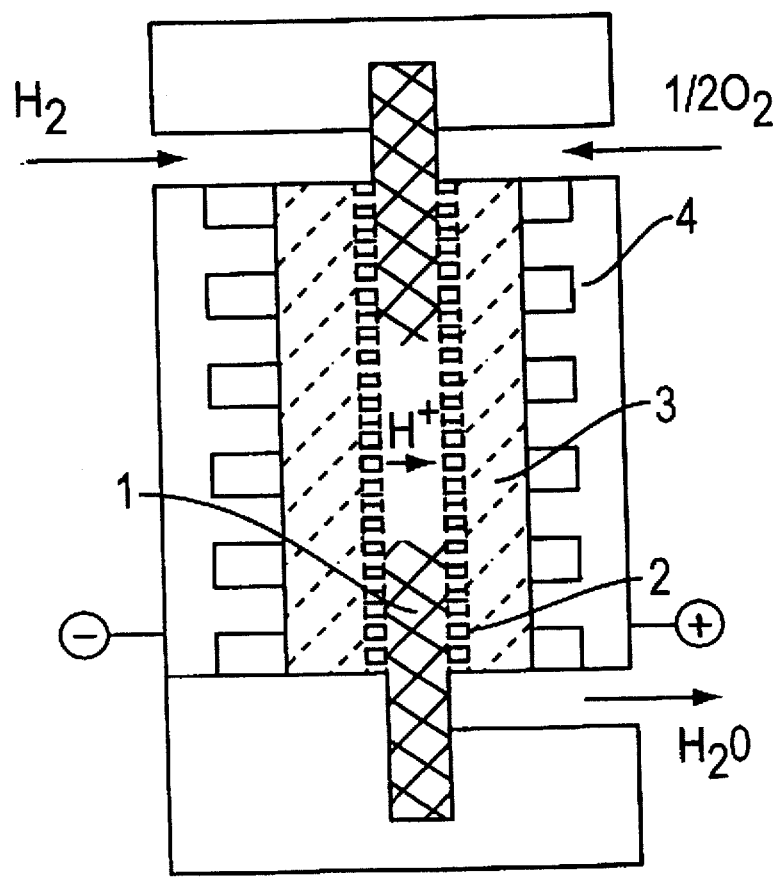
FIG. 2 shows the functional principle of a hydrogen/ oxygen fuel cell with polymeric ion-conductors as a solid electrolyte.

FIG. 2 shows the functional principle of a hydrogen/ oxygen fuel cell with polymeric ion conductors as solid electrolyte. The ionic-exchange membrane 1 is in this case incorporated as the central unit in the fuel cell. In this case the catalyst 2 is directly connected to a porous distributor 3 and to a current collector 4. Operation of the fuel cell occurs in terms of the following reaction equation:

Oxidation:

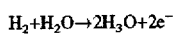

Reduction:

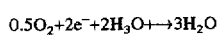

Redox Equation:

$$H_2 + 0.5O_2 \rightarrow H_2O$$

Figure 3:
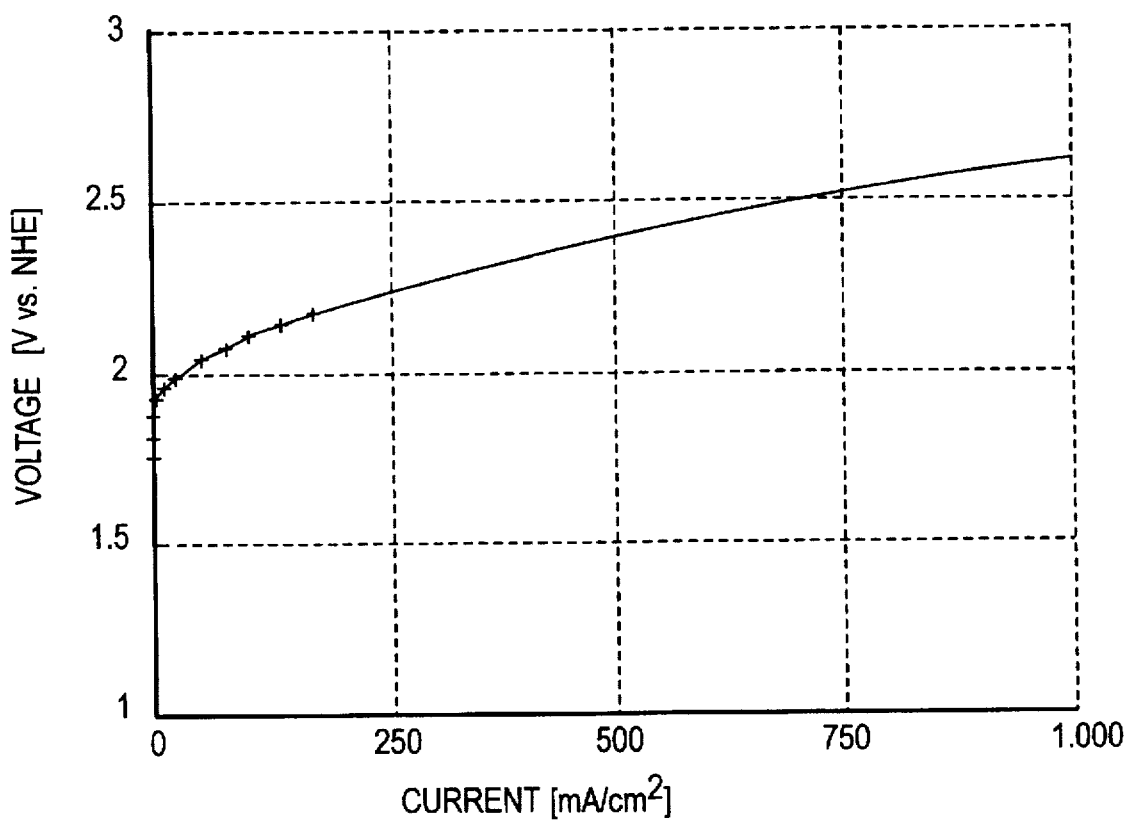
FIG. 3 shows the current-voltage characteristic of an electrode membrane produced according to example 1, which has been used at 26° C. in water electrolysis as a polymeric solid electrolyte.

FIG. 3 now shows a current/voltage characteristic of an electrode membrane produced according to Example 1, which has been used at 26° C. in water electrolysis as a polymeric solid electrolyte. Despite the extreme thinness of the membrane, a fully operative membrane electrode unit could be produced. The I-U-values of the membrane/electrode unit, which in the case of this example has not yet even been optimized, already lie within an extremely good range.

We claim:

1. A method of producing an electrode membrane comprising:
   forming a core zone from ion-dissociable polymers soluble in solvent, the polymers comprising homopolymers, copolymers or mixtures thereof;
   forming an electrode layer, wherein formation of the electrode layer comprises adding a motive agent; and
   wetting a surface of at least one of the core zone and electrode layer with a solvent and bonding the core zone and the electrode layer by pressing the core zone and the electrode layer together while at least one surface of the core zone or electrode layer is wetted to produce a final electrode membrane.

2. The method of producing an electrode membrane of claim 1, wherein the motive agent comprises a solid motive agent.

3. The method of producing an electrode membrane according to claim 1, wherein the homopolymers comprise monomeric units selected from:

substituted Poly(diene):
{—CH$_2$—C(R$_1$)=CH—CH$_2$—}
{—CH$_2$—C(R$_1$) (CH=CH$_2$)—}
{—CH$_2$—CH(C(R$_1$)=CH$_2$)—}
R$_1$=—H, —CH$_3$;

substituted Poly(alkene):
{—CH$_2$—C(R$_2$)(R$_3$)—}
R$_2$=—H, —CH$_3$
R$_3$=—COOH, —COO(R$_4$), —CONH$_2$, —CN, —OH, —O(R$_4$), —OC(O) (R$_4$), —C(O) (R$_4$), —Cl, —C$_6$H$_4$(R$_5$)
R$_4$=—CH$_3$, —C$_2$H$_5$, —C$_3$H$_7$, —C$_4$H$_9$
R$_5$=—COOH, —SO$_3$H, —PO$_3$H$_2$;

substituted Poly(phenyleneoxide) and Poly(phenylenesulfide):
{—X$_1$—R$_6$—}
X$_1$=—O—, —S—
R$_6$=—C$_6$H$_4$—, —C$_6$H$_3$(R$_5$)—, —C$_6$H$_2$(CH$_3$)$_2$—, —C$_6$H(CH$_3$)$_2$(R$_5$)—
R$_5$=—COOH, —SO$_3$H, —PO$_3$H$_2$;

substituted Poly(ester):
{O—C(O)—R$_{14}$—}, {—O—C(O)—R$_{14}$—C(O)—O—R$_{17}$}
R$_{14}$,R$_{17}$=—C$_6$H$_4$—, —C$_6$H$_3$(R$_5$)—, —C$_6$H$_2$(CH$_3$)$_2$—, —C$_6$H(CH$_3$)$_2$(R$_5$)—, —CH$_2$—, —C$_2$H$_4$—, —C$_3$H$_6$—, —C$_4$H$_8$—
R$_5$=—COOH, —SO$_3$H, —PO$_3$H$_2$;

substituted Poly(carbonate):
{—O—C(O)—O—R$_{14}$—C(CH$_3$)$_2$—R$_{17}$—}
R$_{14}$,R$_{17}$=, —C$_6$H$_4$—, —C$_6$H$_3$(R$_5$)—, —C$_6$H$_2$(CH$_3$)$_2$—, [—C$_6$H(CH$_3$)$_2$—(R$_5$)—]—C$_6$H(CH$_3$)$_2$(R$_5$)—, —CH$_2$—, —C$_2$H$_4$—, —C$_3$H$_6$—, —C$_4$H$_8$—
R$_5$=—COOH, —SO$_3$H, —PO$_3$H$_2$;

substituted Poly(urethane):
{—NH—C(O)—O—R$_{14}$—}
R$_{14}$=—C$_6$H$_4$—, —C$_6$H$_3$(R$_5$)—, —C$_6$H$_2$(CH$_3$)$_2$—, —C$_6$H(CH$_3$)$_2$(R$_5$)—, —CH$_2$—, —C$_2$H$_4$—, —C$_3$H$_6$—, —CH$_4$H$_8$—
R$_5$=—COOH, —SO$_3$H, —PO$_3$H$_2$;

substituted Poly(amide):
{—NH—C(O)—R$_{14}$—}, {—NH—C(O)—R$_{14}$C(O)—NH—R$_{17}$—}
R$_{14}$,R$_{17}$=—C$_6$H$_4$—, —C$_6$H$_3$(R$_5$)—, —C$_6$H$_2$(CH$_3$)$_2$—, [—C$_6$H(CH$_3$)$_2$—, (R$_5$)—]—C$_6$H(CH$_3$)$_2$(R$_5$)—, —CH$_2$—, —C$_2$H$_4$—, —C$_3$H$_6$—, —C$_4$H$_8$—
R$_5$=—COOH, —SO$_3$H, —PO$_3$H$_2$;

substituted Poly(carbamide):
{—NH—C(O)—NH—R$_{14}$—}
R$_{14}$=—C$_6$H$_4$—, —C$_6$H$_3$(R$_5$)—, —C$_6$H$_2$(CH$_3$)$_2$—, —C$_6$H(CH$_3$)$_2$(R$_5$)—, —CH$_2$—, —C$_2$H$_4$—, —C$_3$H$_6$—, —C$_4$H$_8$—
R$_5$=—COOH, —SO$_3$H, —PO$_3$H$_2$;

substituted Poly(sulfone):
{—S(O)$_2$—R$_7$—O—R$_8$—C(CH$_3$)$_2$—R$_9$—O—R$_{10}$—}
R$_7$, R$_8$, R$_9$, R$_{10}$=—C$_6$H$_4$—, —C$_6$H$_3$(R$_5$)—, —C$_{10}$H$_6$—, —C$_{10}$H$_5$(R$_5$)—
R$_5$=—COOH, —SO$_3$H, —PO$_3$H$_2$;

substituted Poly(ethersulfone):
{{—S(O)$_2$—R$_7$—}$_n${—O—R$_8$—}$_m$}
n, m=1 or 2
R$_7$, R$_8$=C$_6$H$_4$—, —C$_6$H$_3$(R$_5$)—, —C$_{10}$H$_6$—, —C$_{10}$H$_5$(R$_5$)—
R$_5$=—COOH, —SO$_3$H, —PO$_3$H$_2$;

substituted Poly(sulfonate):
{—O—S(O)—O—R$_6$—}
R$_6$=C$_6$H$_4$—, —C$_6$H$_3$(R$_5$)—, —C$_{10}$H$_6$—, —C$_{10}$H$_5$(R$_5$)—
R$_5$=—COOH, —SO$_3$H, —PO$_3$H$_2$;

substituted Poly(etherketone): [{{—C(O)—R$_7$—}$_n$[—O—R$_8$—}$_m$]]{{—C(O)—R$_7$—}$_n${—O—R$_8$—}$_m$}
n, m=1 or 2
R$_7$, R$_8$=C$_6$H$_4$—, —C$_6$H$_3$(R$_5$)—, —C$_{10}$H$_6$—, —C$_{10}$H$_5$(R$_5$)—
R$_5$=—COOH, —SO$_3$H, —PO$_3$H$_2$;

substituted Poly(perfluoraliphatic): {—CF$_2$—CF(R$_{11}$)—}
R$_{11}$=—F, —C$_6$H$_5$, —C$_6$H$_4$(R$_5$), —OC$_6$H$_4$(R$_5$)
R$_5$=—COOH, —SO$_3$H, —PO$_3$H$_2$;

substituted Poly(benzoxazole):

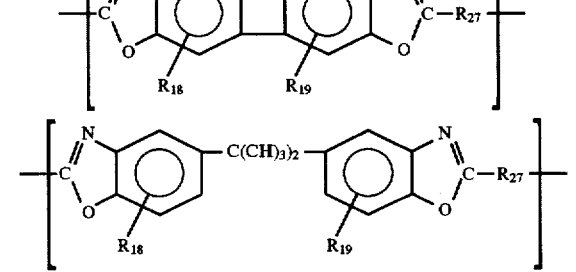

R$_{27}$=—C$_6$H$_3$(R$_{20}$—, —(CH$_2$)$_p$—
R$_{18}$, R$_{19}$, R$_{20}$=—H, —COOH, —SO$_3$H, —PO$_3$H$_2$
p=2-8;

substituted Poly(benzimidazole):

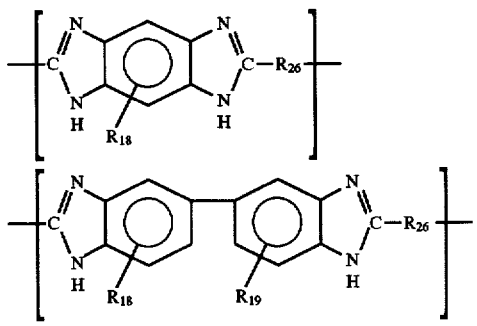

$R_{26}$=—$C_6H_3(R_{20})$—, —$(CH_2)_p$—
$R_{18}$, $R_{19}$, $R_{20}$=—H, —COOH, —$SO_3H$, —$PO_3H_2$
p=2–8;

substituted Poly(dithiazole):

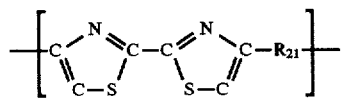

$R_{21}$=—$C_6H_3(R_{20})$—, —$C_6H_3(R_{20})$—$(CH_2)_p$—$C_6H_3$($R_{20}$)—
$R_{20}$=—H, —COOH, —$SO_3H$, —$PO_3H_2$
p=2–8;

substituted Poly (benzothiazole):

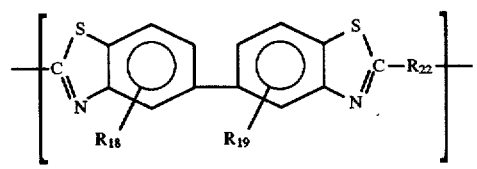

$R_{22}$=—$C_6H_3(R_{20})$—, —$C_6H_3(R_{20})$—O—$C_6H_3(R_{20})$—
—$C_6H_3(R_{20})$—C(O)—$C_6H_3(R_{20})$—
$R_{18}$, $R_{19}$, $R_{20}$=—H, —COOH, —$SO_3H$, —$PO_3H_2$;

substituted Poly(phenylchinoxaline):

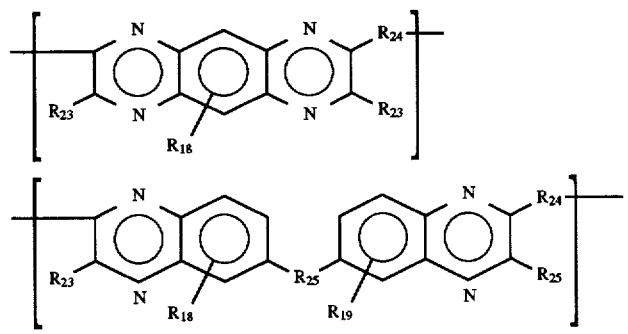

$R_{23}$=—H, —$C_6H_4(R_{20})$
$R_{24}$=—$C_6H_3(R_{20})$—, —$C_6H_3(R_{20})$—$R_{25}$—$C_6H_3$($R_{20}$)—
$R_{25}$=—O—, —S—, —S(O)$_2$, —C(O)—
$R_{18}$, $R_{19}$, $R_{20}$=—H, —COOH, —$SO_3H$, —$PO_3H_2$;

substituted Poly(phosphazene):
{[—P($R_{12}$)($R_{13}$)=N—]}{—P($R_{12}$)($R_{13}$)=N—}
$R_{12}$, $R_{13}$=—$OCH_3$, —$OC_2H_5$, —$OC_3H_7$, —$OC_4H_9$, —$OC_6H_5$, [—$OC_6H_4$, ($R_5$)]$OC_6H_4(R_5)$ $R_5$=COOH, —$SO_3H$, —$PO_3H_2$;

or substituted Poly(siloxane):
{[—O—Si($OR_{15}$) ($OR_{16}$)—]}{—O—Si($OR_{15}$) ($OR_{16}$)—}
{[—O—Si($R_{15}$) ($R_{16}$)—]}{—O—Si($R_{15}$) ($R_{16}$)—}
$R_{15}$, $R_{16}$=—$CH_3$, —$C_2H_5$, —$C_3H_7$, —$C_4H_9$, —$C_6H_5$, [—$C_6H_4$, ($R_5$)]—$C_6H_4(R_5)$
$R_5$=COOH, —$SO_3H$, —$PO_3H_2$.

4. The method of producing an electrode membrane according to claim 3, wherein the ion-dissociable polymers soluble in solvent comprise copolymers which are formed by combining at least two monomeric units of claim 3.

5. The method of producing an electrode membrane according to claim 1, wherein the electrode layer comprises elements of Group VIII of the periodic table or alloys, oxides, mixed oxides or mixtures thereof.

6. A method of producing an electrode membrane comprising:

forming a core zone from ion-dissociable polymers soluble in solvent, the polymers comprising homopolymers, copolymers or mixtures thereof;

forming an electrode layer;

wetting a surface of at least one of the core zone and electrode layer with a solvent and bonding the core zone and the electrode layer by pressing the core zone and the electrode layer together while at least one surface of the core zone or electrode layer is wetted to produce a final electrode membrane; and applying an additive which is a motive agent to the final electrode membrane.

7. The method of producing an electrode membrane according to claim 6, wherein the motive agent is a solid motive agent.

8. A method of producing an electrode membrane comprising:

forming a core zone from ion-dissociable polymers soluble in solvent, the polymers comprising homopolymers, copolymers or mixtures thereof;

forming an electrode layer;

covering the formed electrode layer with a solution or emulsion of an ion-conductive polymer to form an ionically conductive zone contacting an intermediate zone which is electronically and ionically conductive contacting an electronically conductive zone; and wetting a surface of at least one of the core zone and electrode layer with a solvent and bonding the core zone and the electrode layer by pressing the core zone and the electrode layer together while at least one surface of the core zone or electrode layer is wetted to produce a final electrode membrane.

9. The method of producing an electrode membrane according to claim 8, wherein the ion-dissociable polymers further comprise a dissolved motive agent.

10. The method of producing an electrode membrane according to claim 9, wherein the dissolved motive agent is a physical or chemical motive agent.

11. The method of producing an electrode membrane according to claim 10, wherein the physical or chemical motive agent is selected from solvents with boiling points in the region of 20° to 160° C. or thermally-initiated gas-developing compounds with decay temperatures in the range of 20° to 160° C.

12. The method of producing an electrode membrane according to claim 11, wherein the physical or chemical motive agent is selected from 4,4'-oxy-bis (benzolsulfonylsemicarbazide) or azobis (isobutyronitrile).

13. The method of producing an electrode membrane according to claim 8, wherein the formed electrode layer is covered with the solution or emulsion of an ion-conductive polymer by spraying, painting or impregnation.

14. A method of producing an electrode membrane comprising:
forming two electrode layers, wherein the formation of the electrode layers comprises the addition of a motive agent;
applying an ion-dissociable polymer layer comprising homopolymers, copolymers or mixtures thereof, the polymer layer being soluble in solvent, to a surface of each electrode layer to form two semifinished membrane electrodes; and
wetting or etching the ion-dissociable polymer layer of one or both semifinished membrane electrodes with a solvent or polymeric solution and bonding the semifinished electrodes by pressing the semifinished membrane electrodes together, while at least one surface of one of the semifinished electrode members is viscous from the wetting or etching, to produce a final electrode membrane.

15. The method of producing an electrode membrane according to claim 14, wherein the motive agent comprises a solid motive agent.

16. A method of producing an electrode membrane comprising:
forming two electrode layers;
applying an ion-dissociable polymer layer comprising homopolymers, copolymers or mixtures thereof, the polymer layer being soluble in solvent, to a surface of each electrode layer to form two semifinished membrane electrodes;
wetting or etching the ion-dissociable polymer layer of one or both semifinished membrane electrodes with a solvent and bonding the semifinished electrodes by pressing the semifinished membrane electrodes together, while at least one surface of one of the semifinished electrode members is viscous from the wetting or etching, to produce a final electrode membrane; and
applying an additive which is a motive agent to the final electrode membrane.

17. A method of producing an electrode membrane comprising:
forming two electrode layers;
covering the formed electrode layers with a solution or emulsion of an ion-conductive polymer to form an ionically conductive zone contacting an intermediate zone which is electronically and ionically conductive contacting an electronically conductive zone;
applying an ion-dissociable polymer layer comprising homopolymers, copolymers or mixtures thereof, the polymer layer being soluble in solvent, to a surface of each electrode layer to form two semifinished membrane electrodes; and
wetting or etching the ion-dissociable polymer layer of one or both semifinished membrane electrodes with a solvent and bonding the semifinished electrodes by pressing the semifinished membrane electrodes together, while at least one surface of one of the semifinished electrode members is viscous from the wetting or etching, to produce a final electrode membrane.

18. The method of producing an electrode membrane according to claim 17, wherein the ion-dissociable polymer further comprises a dissolved motive agent.

19. The method of producing an electrode membrane according to claim 18, wherein the dissolved motive agent is a physical or chemical motive agent.

20. The method of producing an electrode membrane according to claim 19, wherein the physical or chemical motive agent is selected from solvents with boiling points in the region of 20° to 160° C. or thermally-initiated gas-developing compounds with decay temperatures in the range of 20° to 160° C.

21. The method of producing an electrode membrane according to claim 20, wherein the physical or chemical motive agent is selected from 4,4'-oxy-bis (benzolsulfonylsemicarbazide) or azobis (isobutyronitrile).

22. The method of producing an electrode membrane according to claim 17, wherein the formed electrode layer is covered with the solution or emulsion of an ion-conductive polymer by spraying, painting or impregnation.

23. The method of producing an electrode membrane according to claim 17, wherein the polymer layer soluble in solvent comprises homopolymers comprising monomeric units selected from:
substituted Poly(diene):
{—$CH_2$—$C(R_1)$=CH—$CH_2$—}
{—$CH_2$—$C(R_1)$(CH=$CH_2$)—}
{—$CH_2$—CH(C($R_1$)=$CH_2$)—}
$R_1$=—H, —$CH_3$;
substituted Poly(alkene):
{—$CH_2$—$C(R_2)(R_3)$—}
$R_2$=—H, —$CH_3$
$R_3$=—COOH, —COO($R_4$), —$CONH_2$, —CN, —OH, —O($R_4$), —OC(O)($R_4$), —C(O)($R_4$), —Cl, —$C_6H_4$($R_5$)
$R_4$=—$CH_3$, —$C_2H_5$, —$C_3H_7$, —$C_4H_9$
$R_5$=—COOH, —$SO_3H$, —$PO_3H_2$;
substituted Poly(phenylenoxide) and Poly (phenylenesulfide):
{—$X_1$—$R_6$—}
$X_1$=—O—, —S—
$R_6$=—$C_6H_4$—, —$C_6H_3(R_5)$—, —$C_6H_2(CH_3)_2$—, —$C_6H(CH_3)_2(R_5)$—
$R_5$=—COOH, —$SO_3H$, —$PO_3H_2$;
substituted Poly(ester):
{O—C(O)—$R_{14}$—}, {—O—C(O)—$R_{14}$—C(O)—O—$R_{17}$}
$R_{14}$, $R_{17}$=—$C_6H_4$—, —$C_6H_3(R_5)$—, —$C_6H_2(CH_3)_2$—, —$C_6H(CH_3)_2(R_5)$—, —$CH_2$—, —$C_2H_4$—, —$C_3H_6$—, —$C_4H_8$—
$R_5$=—COOH, —$SO_3H$, —$PO_3H_2$;
substituted Poly(carbonate):

{—O—C(O)—O—R$_{14}$—C(CH$_3$)$_2$—R$_{17}$—}

R$_{14}$, R$_{17}$=—C$_6$H$_4$—, —C$_6$H$_3$(R$_5$)—, —C$_6$H$_2$(CH$_3$)$_2$—,
[—C$_6$H(CH$_3$)$_2$—(R$_5$)—]—C$_6$H(CH$_3$)$_2$(R$_5$)—,
—CH$_2$—, —C$_2$H$_4$—, —C$_3$H$_6$—, —C$_4$H$_8$—

R$_5$=—COOH, —SO$_3$H, —PO$_3$H$_2$;

substituted Poly(urethane):
{—NH—C(O)—O—R$_{14}$—}

R$_{14}$=—C$_6$H$_4$—, —C$_6$H$_3$(R$_5$)—, —C$_6$H$_2$(CH$_3$)$_2$—,
—C$_6$H(CH$_3$)$_2$(R$_5$)—, —CH$_2$—, —C$_2$H$_4$—,
—C$_3$H$_6$—, —C$_4$H$_8$—

R$_5$=—COOH, —SO$_3$H, —PO$_3$H$_2$;

substituted Poly(amide):
{—NH—C(O)—R$_{14}$—}, {—NH—C(O)—R$_{14}$C(O)—NH—R$_{17}$—}

R$_{14}$, R$_{17}$=—C$_6$H$_4$—, —C$_6$H$_3$(R$_5$)—, —C$_6$H$_2$(CH$_3$)$_2$—,
[—C$_6$H(CH$_3$)$_2$—, (R$_5$)—]—C$_6$H(CH$_3$)$_2$(R$_5$)—,
—CH$_2$—, —C$_2$H$_4$—, —C$_3$H$_6$—, —C$_4$H$_8$—

R$_5$=—COOH, —SO$_3$H, —PO$_3$H$_2$;

substituted Poly(carbamide):
{—NH—C(O)—NH—R$_{14}$—}

R$_{14}$=—C$_6$H$_4$—, —C$_6$H$_3$(R$_5$)—, —C$_6$H$_2$(CH$_3$)$_2$—,
—C$_6$H(CH$_3$)$_2$(R$_5$)—, —CH$_2$—, —C$_2$H$_4$—,
—C$_3$H$_6$—, —C$_4$H$_8$—

R$_5$=—COOH, —SO$_3$H, —PO$_3$H$_2$;

substituted Poly(sulfone):
{—S(O)$_2$—R$_7$—O—R$_8$—C(CH$_3$)$_2$—R$_9$—O—R$_{10}$—}

R$_7$, R$_8$, R$_9$, R$_{10}$=—C$_6$H$_4$—, —C$_6$H$_3$(R$_5$)—, —C$_{10}$H$_6$—,
—C$_{10}$H$_5$(R$_5$)—

R$_5$=—COOH, —SO$_3$H, —PO$_3$H$_2$;

substituted Poly(ethersulfone):
{{—S(O)$_2$—R$_7$—}$_n${—O—R$_8$—}$_m$} n, m=1 or 2

R$_7$, R$_8$=—C$_6$H$_4$—, —C$_6$H$_3$(R$_5$)—, —C$_{10}$H$_6$—,
—C$_{10}$H$_5$(R$_5$)—

R$_5$=—COOH, —SO$_3$H, —PO$_3$H$_2$;

substituted Poly(sulfonate):
{—O—S(O)—O—R$_6$—}

R$_6$=—C$_6$H$_4$—, —C$_6$H$_3$(R$_5$)—, —C$_{10}$H$_6$—, —C$_{10}$H$_5$(R$_5$)—

R$_5$=—COOH, —SO$_3$H, —PO$_3$H$_2$;

substituted Poly(etherketone):
[{{—C(O)—R$_7$—]$_n$[—O—R$_8$—}$_m$}]{{—C(O)—R$_7$—}$_n${—O—R$_8$—}$_m$} n, m=1 or 2

R$_7$, R$_8$=—C$_6$H$_4$—, —C$_6$H$_3$(R$_5$)—, —C$_{10}$H$_6$—,
—C$_{10}$H$_5$(R$_5$)—

R$_5$=—COOH, —SO$_3$H, —PO$_3$H$_2$;

substituted Poly(perfluoraliphatic):
{—CF$_2$—CF(R$_{11}$)—}

R$_{11}$=—F, —C$_6$H$_5$, —C$_6$H$_4$(R$_5$), —OC$_6$H$_4$(R$_5$)

R$_5$=—COOH, —SO$_3$H, —PO$_3$H$_2$;

substituted Poly(benzoxazole):

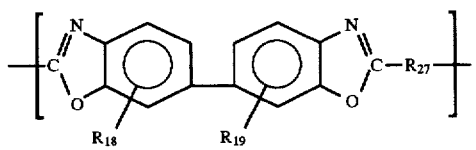

-continued

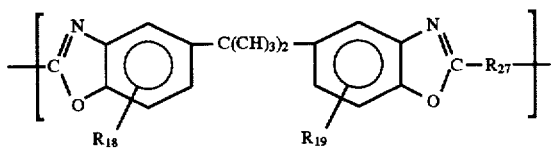

R$_{27}$=—C$_6$H$_3$(R$_{20}$)—, —(CH$_2$)$_p$—

R$_{18}$, R$_{19}$, R$_{20}$=—H, —COOH, —SO$_3$H, —PO$_3$H$_2$ p=2–8;

substituted Poly(benzimidazole):

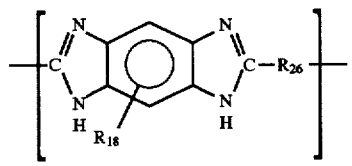

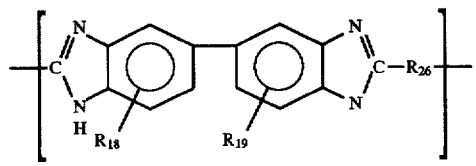

R$_{26}$=—C$_6$H$_3$(R$_{20}$)—, —(CH$_2$)$_p$—

R$_{18}$, R$_{19}$, R$_{20}$=—H, —COOH, —SO$_3$H, —PO$_3$H$_2$ p=2–8;

substituted Poly(dithiazole):

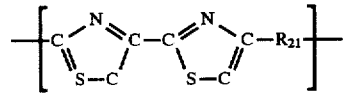

R$_{21}$=—C$_6$H$_3$(R$_{20}$)—, —C$_6$H$_3$(R$_{20}$)—(CH$_2$)$_p$—C$_6$H$_3$(R$_{20}$)—

R$_{20}$=—H, —COOH, —SO$_3$H, —PO$_3$H$_2$ p=2–8;

substituted Poly(benzothiazole):

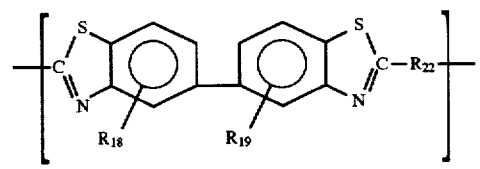

R$_{22}$=—C$_6$H$_3$(R$_{20}$)—, —C$_6$H$_3$(R$_{20}$)—O—C$_6$H$_3$(R$_{20}$)—
—C$_6$H$_3$(R$_{20}$)—C(O)—C$_6$H$_3$(R$_{20}$)—

R$_{18}$, R$_{19}$, R$_{20}$=—H, —COOH, —SO$_3$H, —PO$_3$H$_2$;

substituted Poly(phenylchinoxaline):

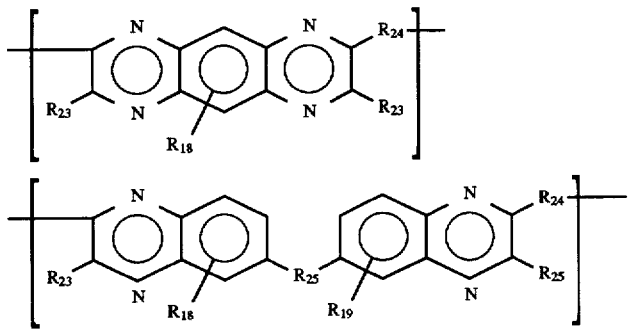

$R_{23}$=—H, —$C_6H_4(R_{20})$ $R_{24}$=—$C_6H_3(R_{20})$—, —$C_6H_3(R_{20})$—$R_{25}$—$C_6H_3$ $(R_{20})$—

$R_{25}$=—O—, —S—, —$S(O)_2$, —C(O)—

$R_{18}$, $R_{19}$, $R_{20}$=—H, —COOH, —$SO_3H$, —$PO_3H_2$;

substituted Poly(phosphazene):

{—$P(R_{12})(R_{13})$=N—}

$R_{12}$, $R_{13}$=—$OCH_3$, —$OC_2H_5$, —$OC_3H_7$, —$OC_4H_9$, —$OC_6H_5$, [—$OC_6H_4$, $(R_5)$]—$OC_6H_4(R_5)$ $R_5$=COOH, —$SO_3H$, —$PO_3H_2$;

or substituted Poly(siloxane):

{—O—Si$(OR_{15})(OR_{16})$—}
{—O—Si$(R_{15})(R_{16})$—}

$R_{15}$, $R_{16}$=—$CH_3$, —$C_2H_5$, —$C_3H_7$, —$C_4H_9$, —$C_6H_5$, —$C_6H_4(R_5)$ $R_5$=COOH, —$SO_3H$, —$PO_3H_2$.

24. The method of producing an electrode membrane according to claim 23, wherein the copolymers are formed by combining at least two monomeric units of claim 23.

25. The method of producing an electrode membrane according to claim 17, wherein the electrode layers comprise elements of Group VIII of the periodic table, or alloys, oxides, mixed oxides or mixtures thereof.

26. A method for producing an electrode membrane comprising:

forming a core zone from ion-dissociable polymers soluble in solvent, the polymers comprising homopolymers, copolymers or mixtures thereof;

forming an electrode layer, wherein the formation of the electrode layer comprises adding a motive agent;

wetting a surface of at least one of the core zone and electrode layer with a solvent to make the surface temporarily viscous;

while the surface of the at least one of the core zone and electrode layer is viscous, pressing together the core zone and electrode layer; and removing the solvent to effect bonding between the core zone and the electrode layer.

27. The method of producing an electrode membrane according to claim 26, wherein the motive agent comprises a solid motive agent.

28. A method for producing an electrode membrane comprising:

forming a core zone from ion-dissociable polymers soluble in solvent, the polymers comprising homopolymers, copolymers or mixtures thereof;

forming an electrode layer;

wetting a surface of at least one of the core zone and electrode layer with a solvent to make the surface temporarily viscous;

while the surface of the at least one of the core zone and electrode layer is viscous, pressing together the core zone and electrode layer;

removing the solvent to effect bonding between the core zone and the electrode layer;

applying an additive which is a motive agent to the final electrode membrane.

29. The method of producing an electrode membrane according to claim 28, wherein the applied additive is a solid motive agent.

30. A method for producing an electrode membrane comprising:

forming a core zone from ion-dissociable polymers soluble in solvent, the polymers comprising homopolymers, copolymers or mixtures thereof;

forming an electrode layer;

covering the formed electrode layer with a solution or emulsion of an ion-conductive polymer to form an ionically conductive zone contacting an intermediate zone which is electronically and ionically conductive contacting an electronically conductive zone;

wetting a surface of at least one of the core zone and electrode layer with a solvent to make the surface temporarily viscous;

while the surface of the at least one of the core zone and electrode layer is viscous, pressing together the core zone and electrode layer; and removing the solvent to effect bonding between the core zone and the electrode layer.

31. The method of producing an electrode membrane according to claim 30, wherein the ion-dissociable polymers further comprise a dissolved motive agent.

32. The method of producing an electrode membrane according to claim 31, wherein the motive agent is a physical or chemical motive agent.

* * * * *